US008509716B2

(12) United States Patent
Fitzpatrick

(10) Patent No.: US 8,509,716 B2
(45) Date of Patent: Aug. 13, 2013

(54) ADAPTIVE IMPEDANCE FOR LNB POWER SUPPLY OUTPUT IN DEPENDENCE ON COMMUNICATION MODE/PROTOCOL

(75) Inventor: John James Fitzpatrick, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 918 days.

(21) Appl. No.: 11/991,722

(22) PCT Filed: Dec. 14, 2005

(86) PCT No.: PCT/US2005/045283
§ 371 (c)(1),
(2), (4) Date: Mar. 6, 2008

(87) PCT Pub. No.: WO2007/040573
PCT Pub. Date: Apr. 12, 2007

(65) Prior Publication Data
US 2009/0124229 A1    May 14, 2009

Related U.S. Application Data

(60) Provisional application No. 60/718,431, filed on Sep. 19, 2005.

(51) Int. Cl.
*H04B 17/02* (2006.01)
*H04K 3/00* (2006.01)

(52) U.S. Cl.
USPC .......................... 455/133; 455/306; 333/101

(58) Field of Classification Search
USPC ........... 455/133, 140, 266, 306, 552.1, 553.1; 333/100–103
See application file for complete search history.

(56) References Cited

U.S. PATENT DOCUMENTS

| 4,542,300 A | 9/1985 | Nagatomi et al. |
| 4,912,520 A | 3/1990 | Yamamoto et al. |
| 5,333,104 A | 7/1994 | Tamura et al. |
| 5,532,654 A | 7/1996 | Ieki et al. |
| 6,031,747 A | 2/2000 | Ilic et al. |

(Continued)

FOREIGN PATENT DOCUMENTS

| DE | 4316945 | 12/1993 |
| DE | 19713124 | 10/1998 |

(Continued)

OTHER PUBLICATIONS

"Digital Satellite Equipment Control (DisEqc), Bus Funtional Specification; version 4.2" Bus Functional Specification, Eutelsat, Paris, FR, Feb. 25, 1998, page complete, XP002348247 The whole document.

(Continued)

*Primary Examiner* — Lee Nguyen
(74) *Attorney, Agent, or Firm* — Robert D. Shedd; Kuniyuki Akiyama

(57) ABSTRACT

A method for selecting antenna configurations in a satellite receiving system, the method comprising: selecting antenna configurations using a first mode of operation wherein frequency shift keying ("FSK") of a frequency is implemented, or a second mode of operation wherein a DC level is implemented, and adaptively controlling a capacitor to condition a signal while the second mode is in use and removing the effects of the capacitor while the first mode is in use.

15 Claims, 3 Drawing Sheets

U.S. PATENT DOCUMENTS

| | | | |
|---|---|---|---|
| 6,032,032 A * | 2/2000 | Kato et al. ............... 455/266 |
| 6,137,367 A | 10/2000 | Ezzedine et al. |
| 6,240,281 B1 | 5/2001 | Le Roux et al. |
| 6,281,756 B1 | 8/2001 | Goto et al. |
| 6,316,964 B1 | 11/2001 | Watarai |
| 6,512,490 B1 | 1/2003 | Lee |
| 6,771,184 B1 | 8/2004 | Steval |
| 7,266,361 B2 * | 9/2007 | Burdett ..................... 455/334 |
| 2004/0028149 A1 | 2/2004 | Krafft et al. |
| 2004/0161031 A1 | 8/2004 | Kwentus et al. |
| 2004/0229562 A1 | 11/2004 | Wren et al. |
| 2005/0009481 A1 | 1/2005 | Bushner |
| 2005/0020204 A1 | 1/2005 | Ducasse |
| 2005/0071877 A1 | 3/2005 | Navarro |
| 2005/0113032 A1 | 5/2005 | Adam |
| 2005/0190777 A1 | 9/2005 | Hess et al. |
| 2005/0193419 A1 | 9/2005 | Lindstrom et al. |

FOREIGN PATENT DOCUMENTS

| | | |
|---|---|---|
| DE | 29814989 | 12/1998 |
| DE | 19749120 | 6/1999 |
| DE | 29915013 | 4/2000 |
| DE | 10155481 | 5/2003 |
| EP | 0757489 | 2/1997 |
| EP | 0949770 | 10/1999 |
| EP | EP 0993115 | 4/2000 |
| EP | 1009113 | 6/2000 |
| EP | 1049194 | 11/2000 |
| EP | 1196854 | 1/2001 |
| EP | 1217836 | 6/2002 |
| JP | 5933337 | 3/1984 |
| JP | 63-309007 | 12/1988 |
| JP | 8-018337 | 1/1996 |
| JP | 11068603 | 3/1999 |
| JP | 2000-20143 | 1/2000 |
| JP | 2001-24148 | 1/2001 |
| JP | 2004-159357 | 6/2004 |
| JP | 2005/160078 | 6/2005 |
| JP | 2005160078 | 6/2005 |
| WO | WO 96/37041 | 11/1996 |
| WO | WO 98/57431 | 12/1998 |
| WO | WO 02/096098 | 11/2002 |
| WO | WO 03/084217 | 10/2003 |
| WO | WO 03/085850 | 10/2003 |
| WO | WO2005/094212 | 10/2005 |

OTHER PUBLICATIONS

Search Report Dated May 10, 2006.

Hirt, E. et al: "A 9.4 Satellite Receiver Switch in MCM-C/D Technology"; Abbreviated Journal Title: PROCEDINGS 2000 HD International Conference on High-Density Interconnect and Systems Packaging (SPIE vol. 4217) Publication Date 2000, pp. 542-546 Conference Paper; ISBN: 0 930815 60 2; Corporate Author; Lab. Of Electron., Eidgenossische Tech. Hochschule, Zurich, Switzerland.

Hirt, E. et al: "A 9.4 Receiver Switch at 2.5 GHz"; Abbreviated Journal Title: (IMAPS-EUROPE PRAGUE 2000, European Microelectronics Packaging and Interconnection Symposium. Proceedings. Publication Date 2000. pp. 157-162. Conference Paper. ISBN: 80 23855093. Corporate Author: Lab. Of Electron., Eidgenossische Tech. Hochschule, Zurich, Switzerland.

* cited by examiner

180
ADAPTIVE IMPEDANCE FOR LNB POWER SUPPLY OUTPUT IN DEPENDENCE ON COMMUNICATION MODE/PROTOCOL

This application claims the benefit under 35 U.S.C. §365 of International Application PCT/US2005/045283, filed Dec. 14, 2005, which was published in accordance with PCT article 21(2) on Apr. 12, 2007 in English and which claims the benefit under 35 U.S.C. §119 of a provisional application 60/718,431 filed in the United States on Sep. 19, 2005.

FIELD OF THE INVENTION

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Satellite television systems, such as DirecTV, have become much more widespread over the past few years. In fact, since the introduction of DirecTV in 1994, more than twelve million American homes have become satellite TV subscribers. Most of these subscribers live in single-family homes where satellite dishes are relatively easy to install and connect. For example, the satellite dish may be installed on the roof of the house.

Many potential subscribers, however, live or temporarily reside in multi-dwelling units ("MDUs"), such as hotels or high-rise apartment buildings. Unfortunately, there are additional challenges involved with providing satellite TV services to the individual dwelling units within an MDU. It may be impractical and/or extremely expensive to provide and connect one satellite dish per dwelling. For example, in a high-rise apartment building with one thousand apartments, it may be impractical to mount one thousand satellite dishes on the roof of the building. Some conventional systems have avoided these issues by converting the digital satellite television signal into an analog signal that can be transmitted via a single coaxial cable to a plurality of dwellings. These systems, however, offer limited channels, have reduced quality compared to all-digital systems, and cannot provide the satellite TV experience to which users who live in single family homes are accustomed.

An alternative solution is to provide a bank of satellites connected to a switch that routes a selected signal to appropriate set top boxes. A 2-way communication between a set top box (or IRD) and the switch selects different antenna configurations. Currently, there are two methods satellite receiver/decoder systems use in such a manner to select different antenna configurations. A standard which encompasses DC level communications and 22 kHz tone communications is set forth in the Eutelsat DiSEqC Bus Functional Specification, Version 4.2 document. The standard is commonly called DiSEqC and allows for two-way transmission of simple information with DC levels or more detailed digital information by use of 22 kHz tones or even PWM modulation of 22 kHz tones. Another method which uses a frequency translation module (FTM), uses a 2.3 MHz, frequency shift key (FSK) modulation scheme to communicate configuration selections.

LNB power supplies employing DiSEqC are required to have a substantial amount of capacitance to ground associated with their outputs. This capacitance tends to distort the 2.3 MHz tone used for communication with FTM satellite antenna switching devices. A system and method that overcomes this problem so that a given IRD can support either approach is desirable.

SUMMARY OF THE INVENTION

Certain aspects commensurate in the scope with the disclosed embodiments of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for using multiple modules for the selection of satellite signals. Specifically, a method for selecting antenna configurations in a satellite receiving system is disclosed, comprising determining whether a receiver is adapted to communicate in a first communication mode or a second communication mode using a communication signal carried by a communication path, if the receiver is adapted to communicate in the first communication mode: employing a first communication protocol for the communication signal, and decoupling a filter element from the communication path, and if the receiver is adapted to communicate in the second communication mode: employing a second communication protocol for the communication signal, and coupling the filter element to the communication path. Another embodiment of the method comprises biasing a transistor to decouple the filter element from the communication path in the first communication mode, and biasing the transistor to couple the filter element to the communication path in the second communication mode, wherein the biasing may be accomplished by the communication signal. A system embodiment is disclosed which comprises a device adapted to identify whether a switch is communicating in a first communication mode that employs a first communication protocol or a second communication mode that employs a second communication protocol, a communication path that is adapted to carry a communication signal between the device and the switch, and a filter element that is adapted to be coupled to the communication path if the switch is operating in the first communication mode and decoupled from the communication path if the switch is operating in the second communication mode.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation specific decisions must be made to achieve the developer's specific goals, such as compliance with system related and business related constraints which may vary from one implementation to another. Moreover, it should be appreciated that such a development effort might be complex and time consuming, but would nevertheless be a routine undertaking of design fabrication and manufacture for those of ordinary skill having the benefit of this disclosure.

Figure 1:
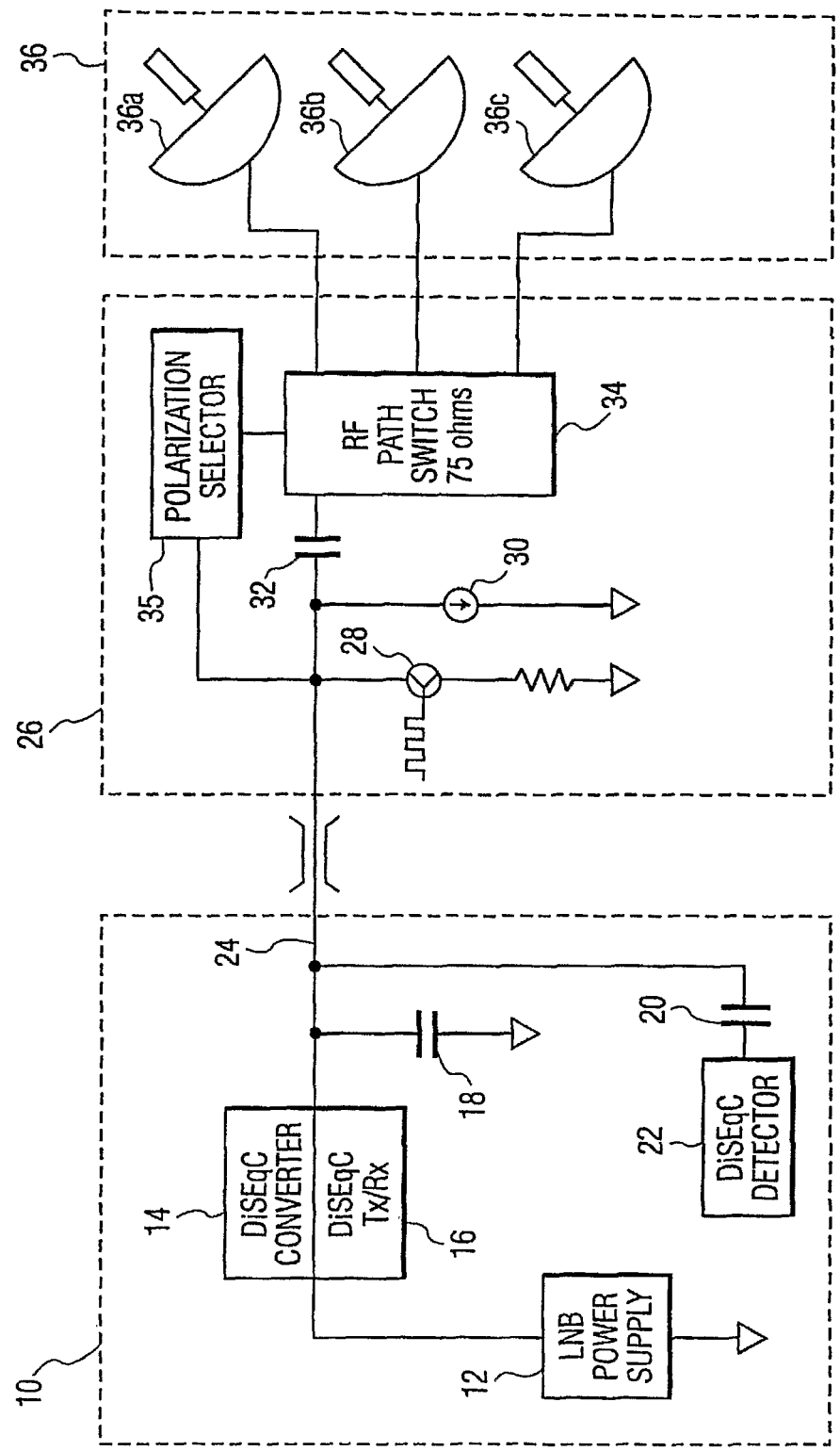
FIG. 1 illustrates an exemplary LNB power supply in accordance with one embodiment of the present invention.

Turning initially to FIG. 1, an exemplary LNB power supply is shown and generally designated by the reference numeral 10. The LNB power supply 10 may comprise an LNB power supply 12, a DiSEqC current pulse to voltage conversion circuit 14, labeled DiSEqC converter in FIG. 1, a DiSEqC Tx/Rx circuit 16, and a DiSEqC detector 22. The LNB power supply 10 uses output voltage levels and may superimpose a 600 mvp-p, 22 kHz tone to select various satellite configurations. A two-stage output voltage (13 volts or 18 volts) is typically used to select among a plurality of incoming satellite signals, each comprising a plurality of program channels. The tone communication is accomplished by either a constant tone of 22 kHz or pulse width modulation ("PWM") of the 22 kHz tone as described in the DiSEqC standard. The output voltages and 22 kHz tone are produced by the LNB power supply 12.

The DiSEqC current pulse to voltage conversion circuit 14 may comprise RLC filter elements, not shown, such as a 220 nF capacitor, a 15 ohm resistor and a 220 mH inductor, in an electrically parallel configuration. These elements are used to convert a 22 kHz pulsed 50 ma current to a voltage waveform. A DiSEqC Tx/Rx circuit 16 further enables the LNB power supply 10 to implement the DiSEqC standard. When transmitting the 22 kHz tone, the DiSEqC converter 14 is bypassed with the DiSEqC Tx/Rx switch circuit 16 and the tone is superimposed onto the output voltage from the LNB power supply 12.

The DiSEqC detector 22 detects and demodulates the voltage waveform superimposed on the LNB DC level by the DiSEqC LNB switch 26. The incoming waveform detected by the DiSEqC detector 22 is shaped primarily by a 220 nF capacitor in the DiSEqC converter 14 and a 220 nF capacitor 18. The 220 nF capacitor 18 reduces the high frequency switching noise from the power supply 12. The division of the capacitance between the two capacitors reduces the amount of capacitance the LNB power supply 12 has to overcome when in a transmitting mode. However, as will be discussed in further detail below, the capacitance to ground provided by the 220 nF capacitor 18 should be significantly reduced when utilizing the FTM mode.

In the exemplary embodiment, the LNB power supply 10 is connected via a 75 ohm transmission line 24 to the DiSEqC LNB switch 26. The transmission line 24 is typically a coaxial cable. The DiSEqC LNB switch 26 comprises a switched current sink 28 and the static device current as modeled by a current sink 30. The switched current sink 28 and the current sink 30 enable the DiSEqC LNB switch 26 to superimpose and pulse an additional 50 milliamps of current onto the LNB power supply 12 DC level current. The pulsed 50 milliamps of current is translated into a semi-sinusoidal voltage by the DiSEqC converter 14. Thus, the switched current sink 28 and current sink 30 enable the DiSEqC LNB switch 26 to communicate with the LNB power supply 10.

The DiSEqC LNB switch 26 also comprises an RF path switch 34 and polarization selector 35. The RF path switch 34 receives the communication from the LNB power supply 10 and allows for selection of a signal among a plurality of satellite signals provided by an antenna bank 36. The RF path switch 34 routes the selected satellite signal to the appropriate set top box. Polarization selector 35 receives the 13 or 18 volt DC level supplied by LNB 10 and in conjunction with RF path switch 34, directs the antennae of antenna bank 36 to select the desired polarization of satellite signals. The antenna bank 36 may comprise a single satellite dish or a plurality of satellite dishes, each capable of receiving signals from multiple satellites. As discussed earlier, the LNB power supply uses output voltage level and the switchable superimposed 22 kHz tone to select among various satellite configurations. Specifically, the presence or absence of the tone may indicate to the RF path switch 34 the selection of a specific satellite. Alternatively, the 22 kHz tone may be pulse width modulated according to the DiSEqC standard to select from among the various satellite configurations available from the antenna bank 36.

Figure 2:
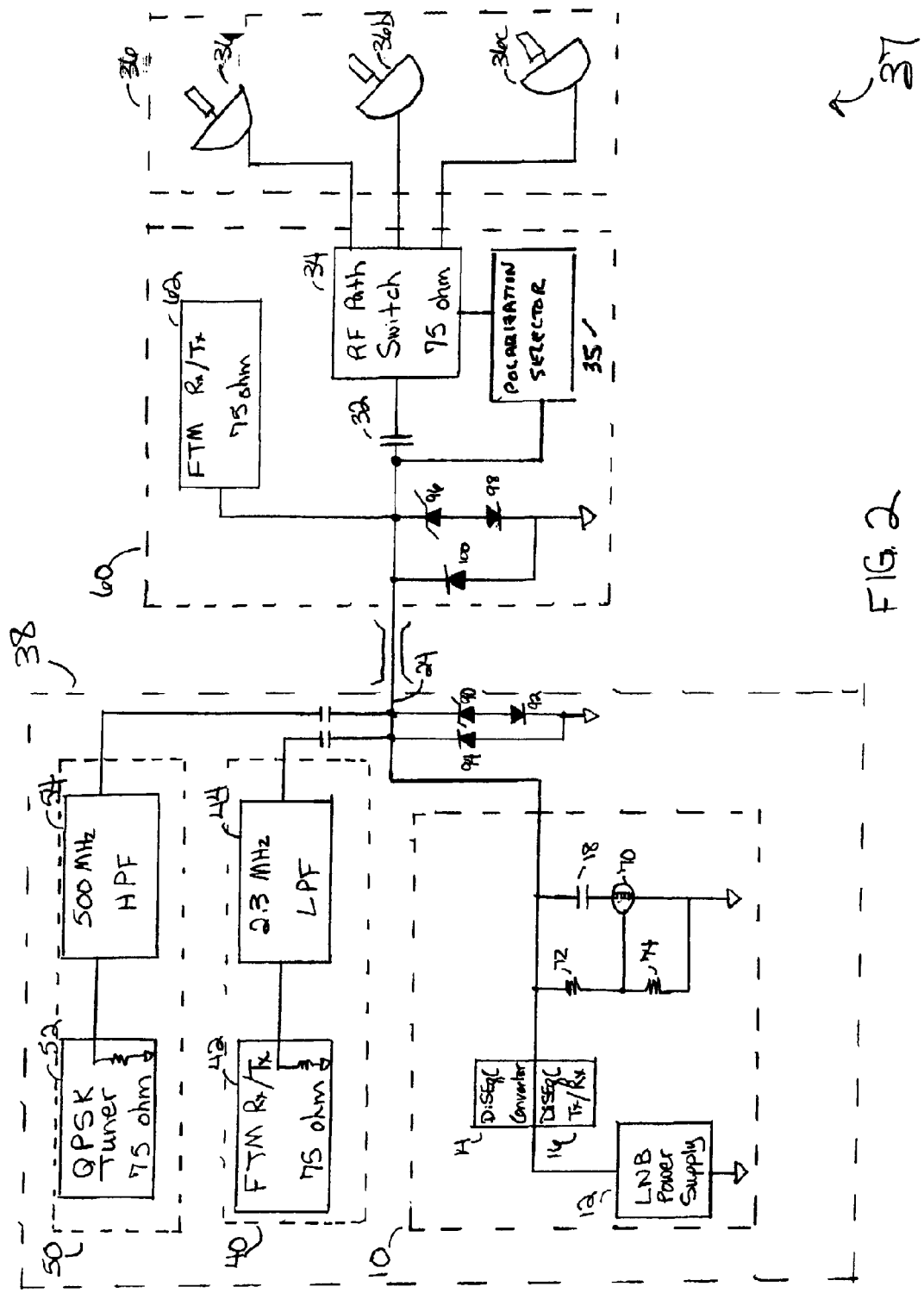
FIG. 2 illustrates an exemplary satellite receiver system in accordance with one embodiment of the present invention.

Turning now to FIG. 2, an exemplary satellite receiver system is shown in accordance with one embodiment of the present invention and is generally designated by the reference numeral 37. The satellite receiver system 37 illustrates an exemplary set top box 38 capable of operating in both the LNB mode and an FTM mode. The set top box 38 comprises a tuner 50, an FTM 40 and the LNB power supply 10 described above. The tuner 50 may comprise a QPSK tuner 52 and a 500 MHz high pass filter 54. The frequency translation module 40 comprises a FTM Tx/Rx circuit 42 and a 2.3 MHz low pass filter 44. In the embodiment shown in FIG. 2, the LNB power supply 10 of the set top box 38 has been modified to include an adaptive capacitance in order to accommodate the use of the FTM 40. The set top box 38 is configured to communicate via a 75 ohm communication line 24 with the FTM switch 60. The FTM switch 60 provides a way for the system to select and route RF from specific antenna receivers to the appropriate set top boxes. The FTM switch 60 comprises an FTM Tx/Rx circuit 62 as well as an RF path switch 34 and polarization selector 35. The FTM Tx/Rx circuit 62 enables the FTM switch 60 to operate with a FTM-capable set top box, such as the set top box 38. The RF path switch 34 and polarization selector 35 enable the set top box 38 to select a signal from among antenna bank 36, as was described above, and further comprises switches and frequency translation circuitry to route a signal to an appropriate set top box transponder.

The LNB power supply 10 and the FTM 40 represent two different ways of selecting various satellite configurations. The set top box 38 is capable of operating in both the convention LNB power supply mode using the LNB power supply 10 and the FTM 2.3 MHz mode of the FTM 40. It is important to note that the set top box 38 may only operate in one mode or the other at a particular time. It need not operate in both the LNB mode and the FTM mode at the same time. Thus, for example, if the FTM module 40 is being utilized, the LNB module 10 may be powered down.

On an operational level, there are fundamental differences between the FTM 40 and the LNB power supply 10. Specifically, it is desirable for the LNB power supply 10 to include a capacitance to ground to reduce switching noise and condition the 22 kHz tone. The reactance of the capacitor is frequency-dependent and has a much greater effect on the circuit when operating at higher frequencies, such as when operating in the FTM mode. Therefore, while the capacitance is needed when using the LNB power supply 10, the capacitance needs to be significantly reduced to use the FTM module 40.

In the exemplary embodiment illustrated in FIG. 2, the FTM module 40 uses a modulated 2.3 MHz signal to facilitate communication between the set top box 38 and the FTM switch 60. The FTM protocol uses Frequency Shift Keying ("FSK") modulation and is under UART control. It operates at 2.3 MHz +/−40 kHz in a 75 ohm environment. The set top box 38 communicates with the remote FTM switch 60 to select the appropriate satellite signal and communicate it to the desired set top box 38. As previously explained, the higher operating frequencies of the FTM protocol accentuates the effects of capacitive loading and interferes with the ability to implement the FTM protocol.

As shown in the set top box 38, the capacitance to ground 18 of the LNB power supply 10 is adaptively configured to appear as a high impedance when the FTM module 40 is in use. While the LNB power supply 12 is placing a voltage on the transmission line 24, the capacitor is included in the circuit. This is accomplished by having the capacitor coupled to ground through a MOSFET 70. The DC voltage provided by the LNB power supply 12 forward biases the MOSFET 70, thus allowing the capacitor 18 to be in circuit to eliminate any noise from the power supply 12 and condition any tones present. If, however, the LNB power supply 12 is turned off, the MOSFET 70 is reverse biased and the effects of the capacitor 18 are significantly reduced or eliminated from the transmission line 24 as the MOSFET switches to a high impedance state. As described above, the LNB power supply 12 is powered down when the FTM module 40 is in use.

This modification of the capacitance to ground 18 of the LNB power supply 10 effectively provides the adaptability to automatically allow the set top box to operate in both an FTM mode and an LNB mode. Furthermore, it maintains simplicity. There is no additional control needed for the removal of the capacitance. When the FTM module 40 is selected and in operation, the LNB module 10 is powered down and the effects of the capacitor are significantly reduced or removed.

Another source of capacitance on the transmission line 24 may include the surge protection diodes 90 and 96. These diodes are used to absorb energy from lightning strikes. The nature of lightning surges makes it desirable to place surge suppression diodes at each end of transmission line 24. The parasitic capacitance of these Transient Voltage Suppression diodes (TVS) type diodes is significant. The effective capacitance to ground of these diodes is reduced by the introduction of low capacitance standard bipolar diodes 92 and 98 in series with diodes 90 and 96 respectively and oppositely poled low capacitance bipolar diodes 94 and 100 to ground to absorb negative surge events.

Figure 3:
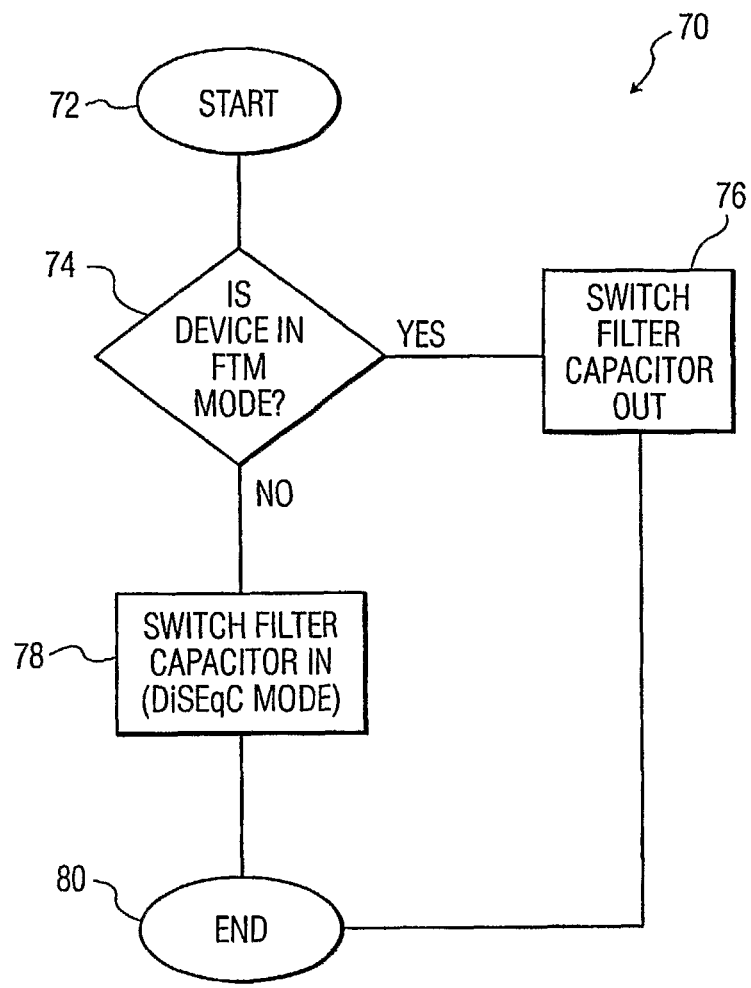
FIG. 3 is a flowchart illustrating an exemplary technique in accordance with one embodiment of the present invention.

Looking at FIG. 3, a flowchart illustrating an exemplary technique is shown in accordance with one embodiment of the present invention. The flowchart is generally designated by the reference numeral 70. The technique 70 begins at block 72. At decision block 74, a determination is made of whether a set top box 38 (FIG. 2) is operating in a 2.3 MHz FTM mode. In order to operate in the FTM mode, both the switch and the set top box should be FTM compatible. As discussed above, the set top box does not need to operate in more than one mode at any given time. If the set top box is not operating in the FTM mode, then it may be assumed to be in the DiSEqC mode and the LNB power supply 10 (FIG. 2) is on. The presence of the DC voltage from the LNB power supply forward biases a MOSFET 70 (FIG. 2) and thus places the capacitor 18 (FIG. 2) in the circuit, as illustrated at block 78.

Alternatively, if the set top box is operating in the FTM mode, the LNB power supply 10 (FIG. 2) is not placing a voltage on the transmission line and the MOSFET 70 (FIG. 2) is reverse biased. This causes the MOSFET 70 (FIG. 2) to go into a high impedance state and removes the effects of the 220 nF capacitor 18 (FIG. 2) from the transmission line 24 (FIG. 2), as shown at block 76. Thus, the output of the LNB power supply 10 (FIG. 2) looks like a high impedance when in the 2.3 MHz mode. The capacitance is therefore adaptively controlled to be in circuit while the LNB power supply is in operation and removed while the FTM module is in operation. At block 80, the process ends.

While the invention may be susceptible to various modifications and alternative forms, specific embodiments have been shown by way of example in the drawings and described in detail herein. However, it should be understood that the invention is not intended to be limited to the particular forms disclosed, rather the invention is to cover all modifications, equivalents and alternatives falling within the spirit and scope of the invention as defined by the following appended claims.

What is claimed is:

1. A method comprising the steps of:
    determining whether a receiver is adapted to communicate in a first communication mode or a second communication mode via a communication signal carried by a communication path;
    employing a first communication protocol for communication in the first communication mode;
    biasing a transistor to decouple a filter element from the communication path in the first communication mode;
    employing a second communication protocol for communication in the second communication mode, and
    biasing the transistor to couple the filter element to the communication path in the second communication mode, said biasing being accomplished by the communication signal.

2. The method of claim 1, wherein the filter element comprises a capacitor.

3. The method of claim 1, comprising coupling the filter element to the communication path when the transistor is forward biased.

4. The method of claim 1, comprising decoupling the filter element from the communication path when the transistor is not forward biased.

5. The method of claim 1, wherein the first communication protocol comprises a 2.3 MHz +/−40 kHz frequency component.

6. The method of claim 1, wherein the second communication protocol comprises a DC level.

7. A system comprising:
    a device adapted to identify whether a switch is communicating in a first communication mode that employs a first communication protocol or a second communication mode that employs a second communication protocol;
    a communication path that is adapted to carry a communication signal between the device and the switch; and
    a filter element that is adapted to be coupled to the communication path if the switch is operating in the first communication mode and decoupled from the communication path if the switch is operating in the second communication mode; and
    a transistor adapted to couple the filter element to and decouple the filter element from the communication path, wherein the filter element is coupled to the communication path when the transistor is forward biased and decoupled from the communication path when the transistor is not forward biased, the biasing being accomplished by the communication signal.

8. The system of claim 7, wherein the filter element comprises a capacitor.

9. The system of claim 7, wherein the transistor is forward biased when the switch is communicating in the second communication mode and is not forward biased when switch is communicating in the first communication mode.

10. The system of claim 7, wherein the communication signal employs a 2.3 MHz +/−40 kHz frequency component in the first communication mode.

11. The system of claim 7, wherein the communication signal employs a DC level in the second communication mode.

12. A system comprising:
- means for determining whether a receiver is adapted to communicate in a first communication mode or a second communication mode using a communication signal carried by a communication path;
- means for employing a first communication protocol for the communication signal and for decoupling a filter element from the communication path if the receiver is adapted to communicate in the first communication mode;
- means for coupling the filter element to the communication path and for employing a second communication protocol for the communication signal if the receiver is adapted to communicate in the second communication mode, wherein the filter element is decoupled from the communication path in the first communication mode and coupled to the communication path in the second communication mode; and
- wherein a transistor is reverse biased when the system is adapted to communicate in the first communication mode and forward biased when the system is adapted to communicate in the second communication mode, and wherein the biasing is accomplished by the communication signal.

13. The system of claim 12, wherein the filter element comprises a capacitor.

14. The system of claim 12, wherein the communication signal comprises a 2.3 MHz +/−40 kHz frequency component in the first communication mode.

15. The system of claim 12, wherein the communication signal comprises a DC level in the second communication mode.

* * * * *